(12) United States Patent
Kanevsky et al.

(10) Patent No.: US 6,912,580 B1
(45) Date of Patent: Jun. 28, 2005

(54) VIRTUAL SHADOW BRIEFCASE IN SERVERS SUPPORTING MOVING EMBEDDED CLIENTS

(75) Inventors: Dimitri Kanevsky, Ossining, NY (US); Wlodek Wlodzimierz Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,109

(22) Filed: Jan. 27, 1999

(51) Int. Cl.[7] ............................. G06F 15/16; H04Q 7/20
(52) U.S. Cl. ........................................ 709/228; 455/442
(58) Field of Search ................................ 709/203, 208, 709/227, 237, 317, 320, 328, 228, 225; 455/421, 422, 433, 436, 437, 440, 442, 456; 370/331

(56) References Cited

U.S. PATENT DOCUMENTS

| | | | | |
|---|---|---|---|---|
| 5,471,190 A | * | 11/1995 | Zimmermann | 340/310.01 |
| 5,572,528 A | * | 11/1996 | Shuen | 370/402 |
| 5,626,417 A | | 5/1997 | McCavit | |
| 5,657,425 A | * | 8/1997 | Johnson | 704/275 |
| 5,673,322 A | * | 9/1997 | Pepe et al. | 705/52 |
| 5,745,035 A | | 4/1998 | Deyo | |
| 5,781,857 A | * | 7/1998 | Hwang et al. | 455/412 |
| 5,814,902 A | * | 9/1998 | Creasy et al. | 370/116 |
| 6,005,884 A | * | 12/1999 | Cook et al. | 375/132 |
| 6,092,039 A | * | 7/2000 | Zingher | 704/221 |
| 6,094,712 A | * | 7/2000 | Follett et al. | 711/203 |
| 6,198,479 B1 | * | 3/2001 | Humplemen | 345/733 |
| 6,199,762 B1 | * | 3/2001 | Hohle | 235/492 |
| 6,219,645 B1 | * | 4/2001 | Byers | 704/275 |
| 6,224,477 B1 | * | 5/2001 | Ho et al. | 455/433 |
| 6,236,835 B1 | * | 5/2001 | Lockhart | 340/7.21 |
| 6,253,074 B1 | * | 6/2001 | Carlsson et al. | 455/414 |
| 6,253,326 B1 | * | 6/2001 | Lincke et al. | 713/201 |
| 6,256,498 B1 | * | 7/2001 | Ludwig | 455/433 |
| 6,272,129 B1 | * | 8/2001 | Dynarski et al. | 370/356 |
| 6,275,922 B1 | * | 8/2001 | Bertsch | 712/36 |
| 6,285,868 B1 | * | 9/2001 | LaDue | 455/410 |
| 6,292,657 B1 | * | 9/2001 | Laursen et al. | 455/411 |
| 6,330,689 B1 | * | 12/2001 | Jin et al. | 714/15 |

OTHER PUBLICATIONS

Nakajima, T. et al. "Adaptive continuous media applications in mobile copmuter environments", IEEE Conf. on Multimedia Computing and Systems, pp. 152–160, Jun. 1997.*

Hasedawa, A. et al. "A user interface system for home applicances with virtual network computing", IEEE Conf. on Distributed Computing Systems Workshop, pp. 229–234, Apr. 2001.*

"Automatic Speech Recognition (ASR) Development Tools", L&H speech technologies, http://www.1hs.com/speechtech/embddevtools/.

(Continued)

Primary Examiner—Jason D. Cardone
(74) Attorney, Agent, or Firm—Louis J. Percello, Esq.

(57) ABSTRACT

A computer has one or more communication interfaces that determine if one or more client (client devices) is within a range of communication of the computer. The computer also has one or more computer interfaces capable of communicating with one or more of the second computers. The second computers can be at any general location and/or installed as subsystems of other devices. An application process determines from the client signal that the client is within the range of communication and that requests and receives one or more of the application programs through the computer interface from one or more of the second computers at the commuter location. Thus, the application program (and necessary databases) are moved to a next computer as the client moves within the range of communication of this next computer. The application programs/databases can be discarded once the client moves outside of the range of communication of the computer.

60 Claims, 9 Drawing Sheets

OTHER PUBLICATIONS

"Electric Pen", http://www.execps.com/~catrina/.

Want et al., "Method and Device for Maintaining Processing Continuity for Mobile Computer in Wireless Network," Patent Abstracts of Japan, Publication No. 07-121458 (May 12, 1995).

K. Isoda, "Server Environment Moving Method and Server Network," Patent Abstracts of Japan, Publication No. 10-247177 (Sep. 14, 1998).

Kato et al., "Information Processor Having Infrared Communication Function and Its Control Method," Publication No. 11-015761 (Jan. 22, 1999).

* cited by examiner

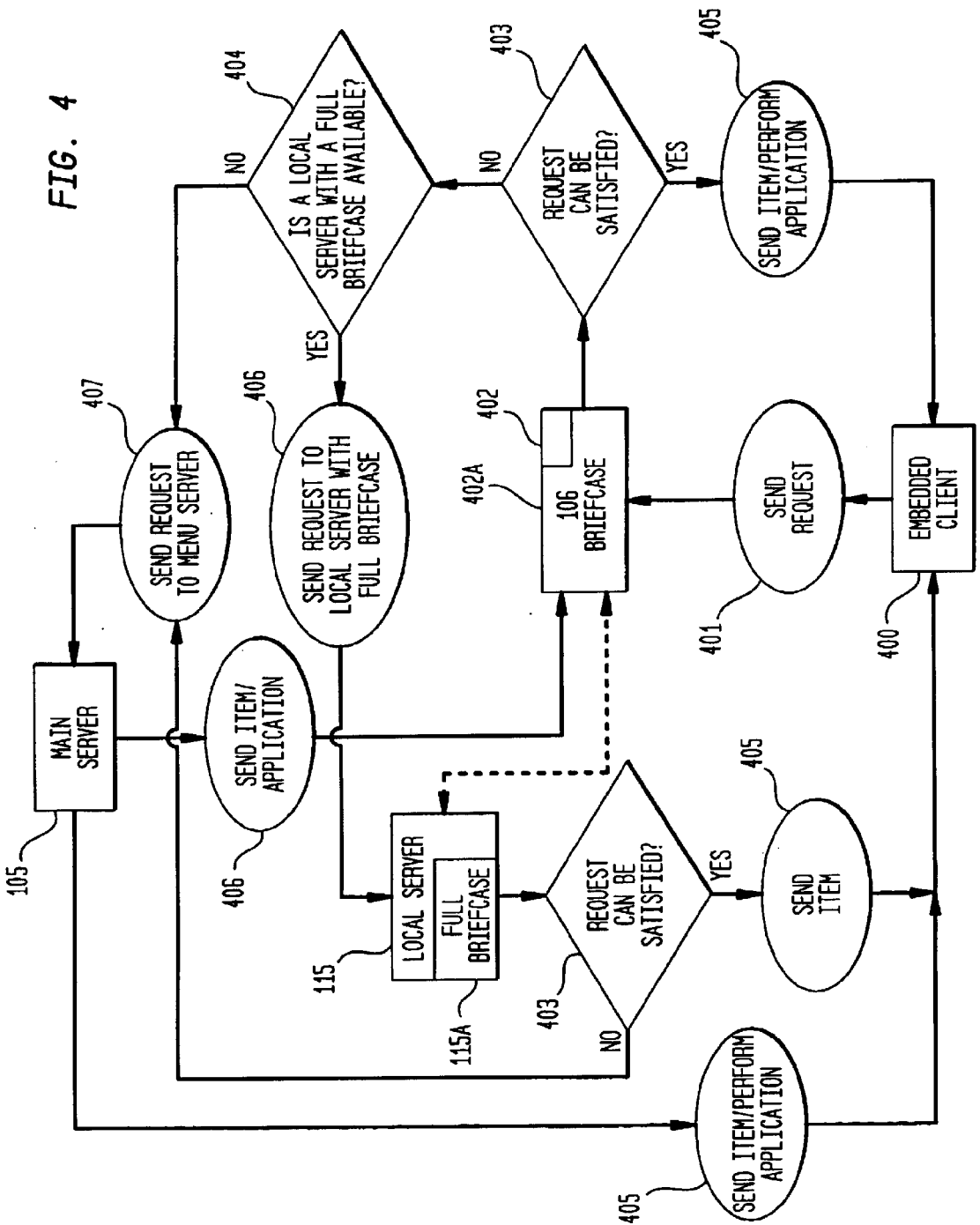

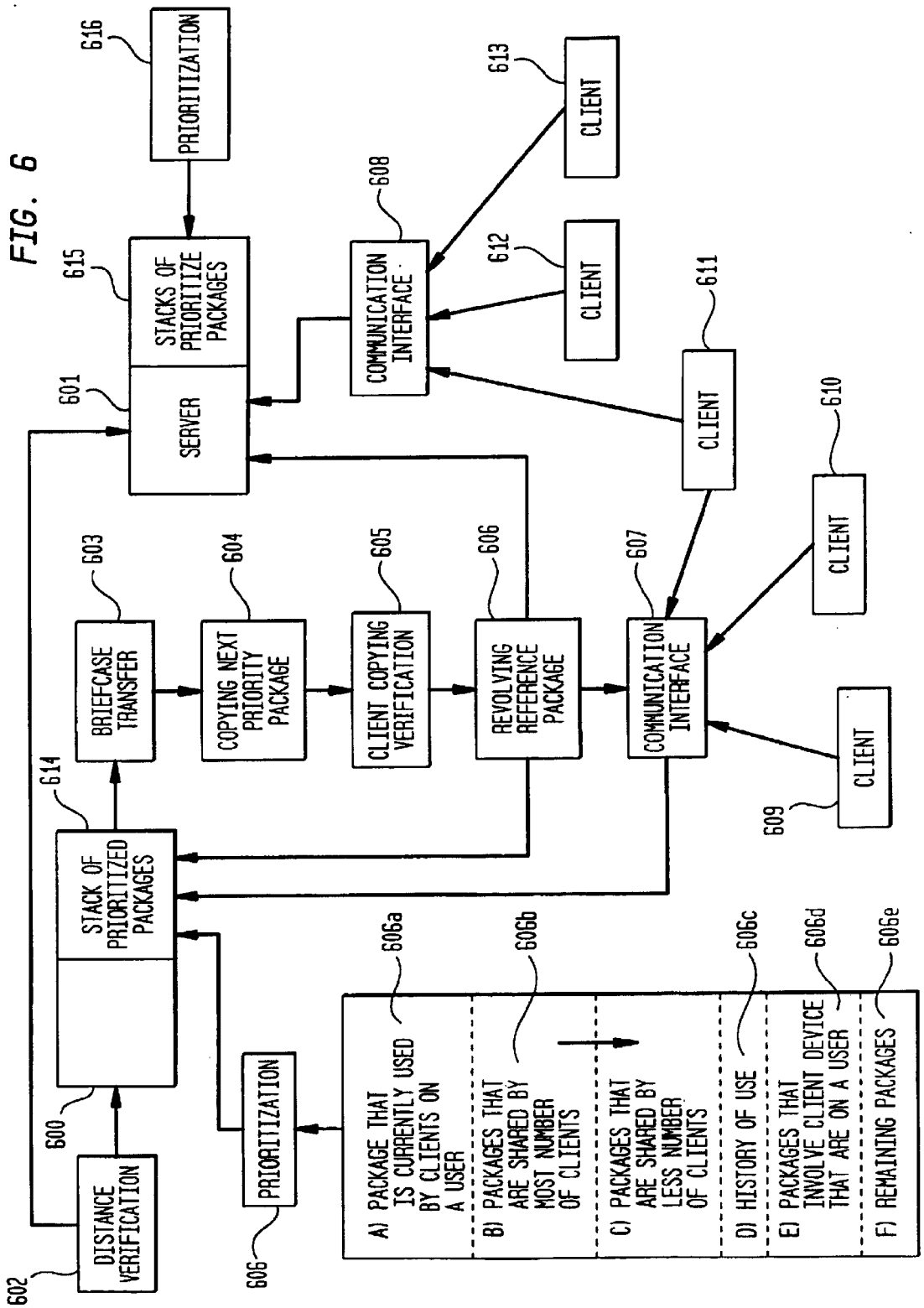

VIRTUAL SHADOW BRIEFCASE IN SERVERS SUPPORTING MOVING EMBEDDED CLIENTS

FIELD OF THE INVENTION

The invention relates to client-server interfaces for embedded devices. More specifically, the invention relates to providing access to server packages for embedded clients that are constantly changing their location.

BACKGROUND OF THE INVENTION

Using computer processors and memories for various purposes in portable devices (like a palmtop, digital camera wallet, key, pen, wrist watch, smart phone, business and visa cards, tape etc.) is expanding everywhere in modern life. These embedded computer powers allow to add to wearable devices such additional functions as Internet browsing, storing personal data, user friendly control over basic device functions, recording and decoding user speech or handwriting input verification of user identity etc.

For example, there exist keys equipped with chips whose function is to send a loud signal when their owners are looking for them and make some sounds (like slapping their hands). As another example: some digital wrist watches are equipped with a small calculator and can store a limited number of telephones numbers. Smart phones allow limited web browsing, business cards can interchange with stored personal data when their owners shake their hands (PAN cards) etc. These wearable portable devices have limited computer power (due their small sizes) and therefore can perform relatively simple functions. There is a general need to allow these small devices to perform function that require more computer processing power. For example, to add wrist watch capacity to recognize and understand voice commands (since controlling some watch functions—setting time, date, performing calculations on a watch calculator would be simpler with voice than with hand manipulations).

PROBLEMS WITH THE PRIOR ART

Currently functions that require relatively large computing power can not be performed by portable devices like wearable computers.

Some attempts have been made to transfer computationally intensive tasks to more powerful computers, e.g. to servers on a network. However, the server may have to share its processing power between a large number of clients that can cause the processing time allotted to each client to be limited. This situation might occur when a large number of clients enter the communication range of one particular server.

Further, interchanging data via communication links, e.g. a cellular channel between a remote server and embedded devices, can be slow due to the fact that communication often needs to go through several switches.

Also, there may be network limitations on the client/server communication. If a large number of server/client connections may have to be handled by the same links (e.g. all employees trying to perform the same application on the same intranet of a large corporate building), the speed of the entire network system can be slow or even malfunction.

In addition, people/clients using wearable devices with embedded technology can go far away from a server and therefore can move out of a range of communication with the server/network. In this case, no communication between the client and the server would be available.

OBJECTS OF THE INVENTION

An object of this invention is an improved method and system for communicating/interchanging data between servers and embedded devices wearable by moving persons/clients.

SUMMARY OF THE INVENTION

The present invention is an improved computer system and method that has one or more memories and one or more central processing units (CPUs). The computer has one or more communication interfaces that determine if one or more client (client devices) is within a range of communication of the computer. The computer also has one or more computer interfaces capable of communicating with one or more of the second computers. The second computers can be at any general location and/or installed as subsystems of other devices.

An application process is executed by one or more of the CPUs. The application process determines from the client signal that the client is within the range of communication. If the client is within range of communication of one or more of the second computers, the client may request and receive one or more of the application programs through the computer interface from one or more of the second computers at the second computer location. In this way, the client can cause one or more of the CPUs to execute one or more of the application programs. In a more preferred embodiment, the application program (and necessary databases) are moved to a next computer as the client moves within the range of communication of this next computer. The application programs/databases can be discarded in the second/next computer once the client moves outside of the range of communication of that respective computer.

BRIEF DESCRIPTION OF THE DRAWINGS

FIG. 4 is an example of client-briefcase-server data interchange.

FIG. 6 is a flowchart for a briefcase transportation.

DETAILED DESCRIPTION OF THE INVENTION

Figure 1:
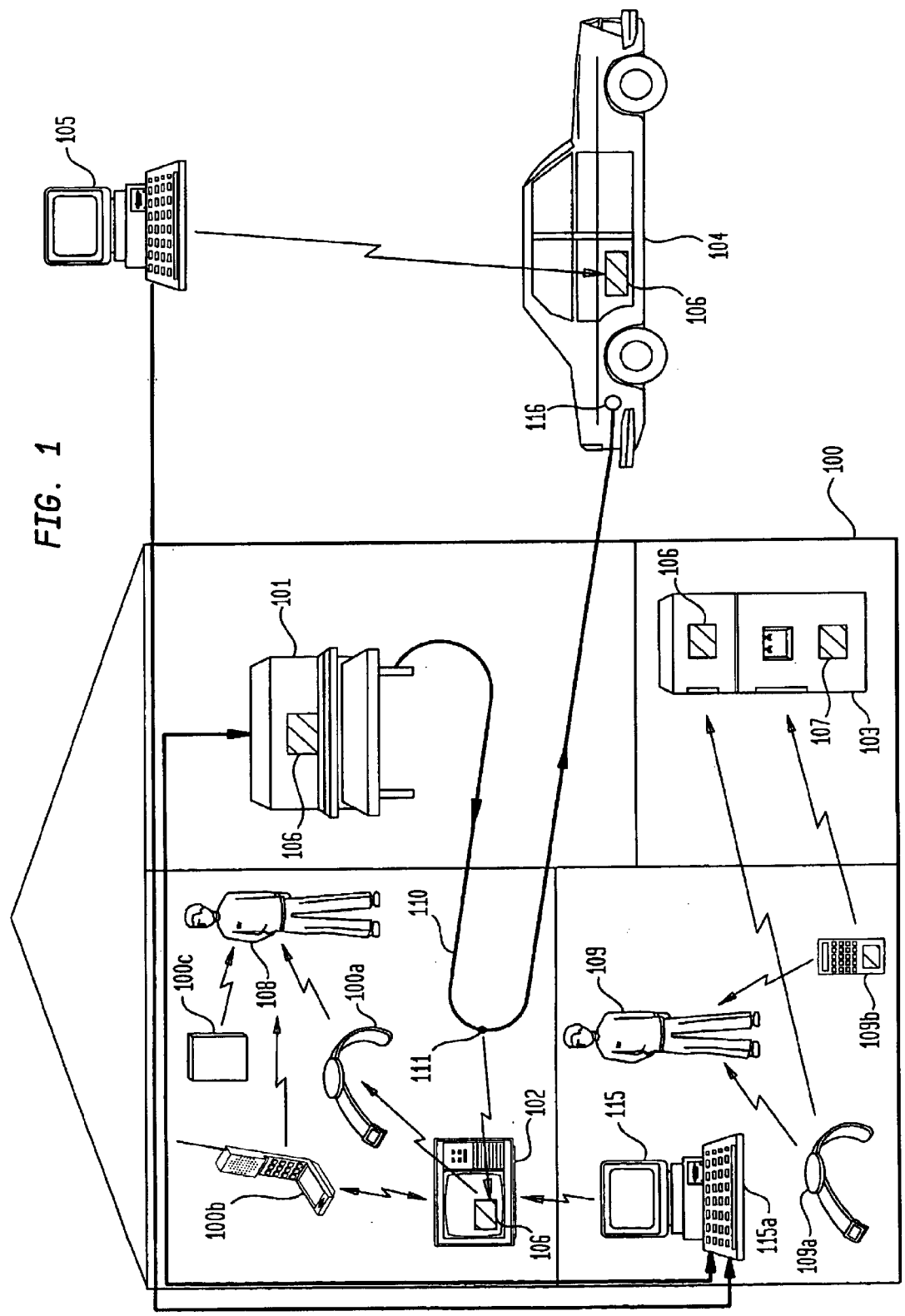
FIG. 1 is a drawing of a moving client that is followed by a virtual shadow briefcase through a embedded server network.

The invention concerns data and programs located in a server that supports user wearable and/or embedded client devices. The invention stores this server package in a virtual briefcase that is moving, from server to server on a network, as a virtual shadow of the client used by the user as the user moves along a user path. This virtual shadow briefcase communicates from a server over wireless communication channels and provides needed software or data items by client request. Alternatively, the server in communication proximity to the moving client can "push" data and/or programs to the client. Clients can be embedded in such portable things as a wrist watch, wallet, palmtop, pen, etc.

and support front ends of automatic speech and handwriting recognition systems. Additional front ends are possible, like: user verification systems, Java applets, displays, keyboards, Internet browsing, word processors, etc. The vitual briefcase can contain such items as personal user data (e.g., telephones, user speech prototypes, user biometrics), general data that is often used by the user (e.g., dictionaries), software packages for supporting speech, handwriting and user verification recognition systems, spelling programs (for word processors), programs for searching database, programs for supporting Java applets etc. This briefcase virtual package can be located in computer processors and memories (servers) of large devices that surround people in everyday life; e.g. TV, refrigerator, electrical piano, cars, PCs etc. These devices are connected to a network system and can interchange data among themselves over the led network. These devices can also contain embedded CPUs (but with higher processing powers than wearable embedded devices, i.e., the clients). All these shadow servers that are inserted in devices for every day use may be connected with a central server system located in a powerful computer (or a mainframe). This central server can contain all data for all users. While users move from one object to another, their virtual briefcases follow their owners from one device to another like virtual shadows. In other words, a shadow server contain a user virtual briefcase only when s/he located near this server. Alternative, servers on a known client path that are about to come in communication proximity with the client may also have the software/data that comprises the briefcase.

There are various devices that allow detection of a person/client near some location. These devices can include but are not limited to: a pressure sensor, an ultrasonic detector, a radio frequency tag, a motion detector.

Some of these devices are described in U.S. Pat. No. (5,745,035, Motion Detection System) and in U.S. Pat. No. 5,626,417 (Motion detection assembly for use with a decorative lamp). These references are herein incorporated by reference in their entirety.

When s/he (the client computer) is moving to a nearer server, a content of the owner's briefcase is transferred to this (second/next) server. This allows to users to immediate access their virtual briefcases everywhere along their way. Since servers are located near clients they can communicate with this client using short range radio waves with a large channel capacity.

There are several methods for detecting which shadow server is nearer to a person. One is to measure a strength of a signal that is transmitted from the user to servers. Another method is to use infra rays for detecting whether the user is passing a given server.

Typically, relatively few users would be located near a server with their virtual briefcases. For example, in a kitchen near refrigerator (with an embedded server) or in a bedroom near electrical lamp (with another embedded server) usually only one-two adults may have active wearable embedded clients. For this reason, in many applications servers do not need to share their computer powers with many users as would normally occur for a central server that is used by a large number of clients.

Nevertheless, in some alternative embodiments (e.g. a user is moving faster than a speed of transmission between two different neighbor servers or there are too many clients near some server), a central server can be used to perform server functions until a normal work of a virtual briefcase would be recovered.

For different applications, different methods for storing, in clients and servers, different functions and modules can be suggested. One standard on how functions and modules in Automatic [speech] Speech Recognition (ASR) can be distributed between a client and server can be found in the U.S. Pat. No. 6,092,039, by A. Zingher, entitled "Symbiotic Automatic Speech Recognition and Vocoder," issued on Jul. 18, 2000, which is herein incorporated by reference in its entirety. This referenced application describes the configuration of client/server in an IBM Voice Type 3 ASR system. This description can be used for configuring a client embedded system and a briefcase in a server.

Description of products for embedded ASR can be found on internet (www.lbs.com/speechtech/embddevtools/asr.asp). One can also use an electric pen for introducing input. Example of use of an electric pen can be found in (www.execpc.com/~catrina/pen/). These references are also incorporated by reference in their entirety.

Usually client embedded devices perform functions that are needed for front end processing, For example, a front end of a speech recognition system can include a microphone and signal processor. A front end of a word processing system can includes a keyboard, a front end of handwriting recognition system can include a digital pen and a tablet. Similarly, front ends are needed for a user verification system, a user identification system, a natural language understanding system etc.

Back ends of various applications can be stored in server briefcase as well. An automatic speech recognition back end can include a decoder output (that is processed by other devices, for example, natural understanding system to understand a user commands), a automatic handwriting recognition system back end can also include means for processing decoding output, a user verification system back end can include output means from results of verification of user identity. Similarly, the system may have well known a user identification system back end, a natural language understanding system back end, a word processing system back end. Databases (e.g. user prototypes, dictionaries etc.) can be stored in briefcase servers.

Figure 1A:
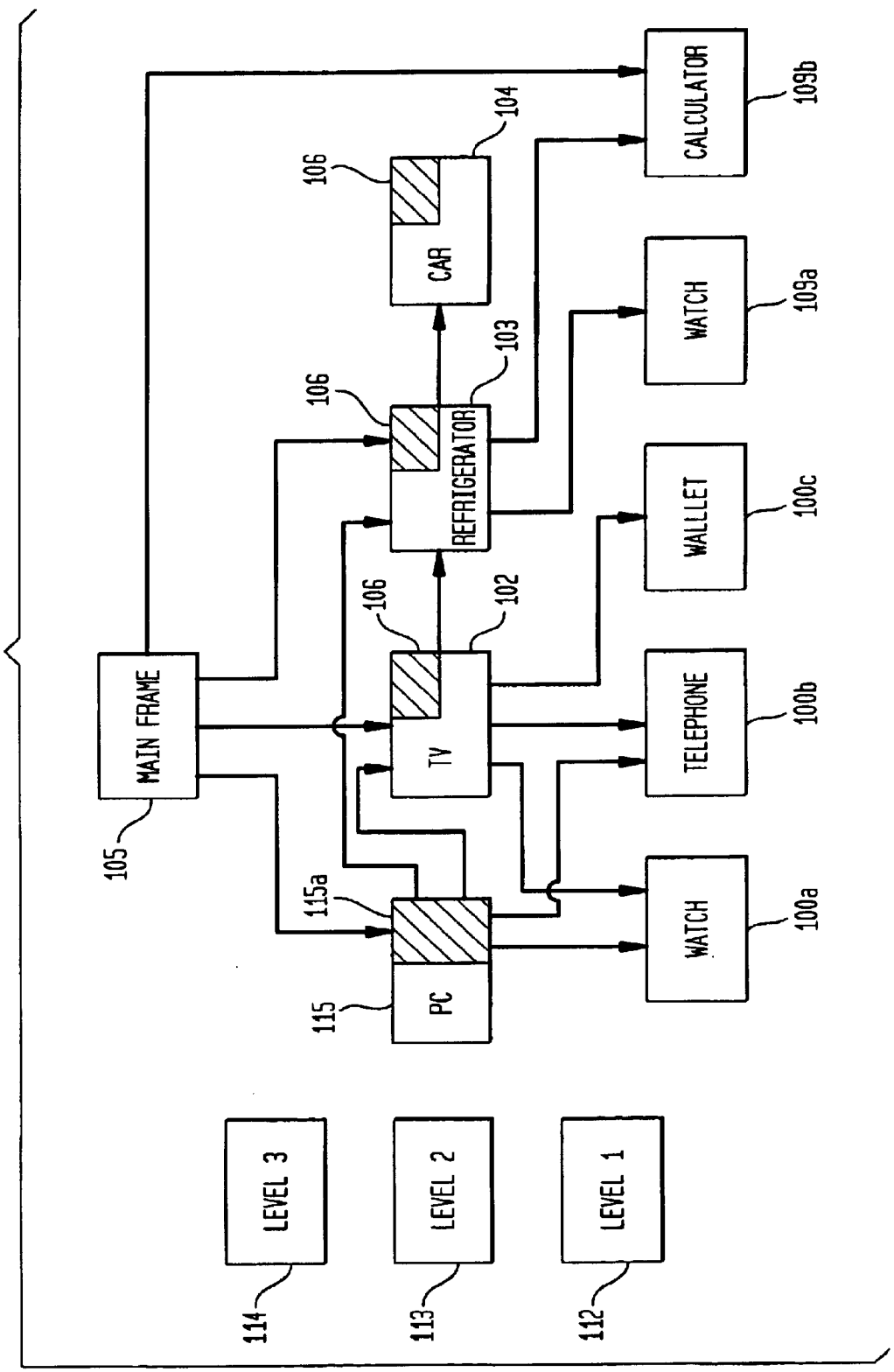
FIG. 1A is a block diagram of a network with a shadow virtual briefcase.

With reference now to the figures and in particular to FIG. 1 and FIG. 1A, there is illustrated a network system in accordance with the method and system of the present invention. Typically the network system for supporting shadow virtual briefcase provides three computing levels (112, 113 and 114 in FIG. 1A). In FIG. 1, a non limiting example of network system is given that is located in a home 100 and a car 106. In FIG. 1A this network is described as a block-scheme. In a first level (112) this network includes embedded clients that are inserted in wearable devices (e.g. a wrist watch 100a, a cellular telephone 100b, a digital wallet 100c) that are located on a person 108 and a wrist watch 109a and a calculator 109b that are located on another person 109. A second level (113) of the network comprises a more powerful computer system that is embedded in non portable devices such as an electrical piano (101) that is located in one room in FIG. 1, a TV (102) that is located in a different room, a refrigerator (103) in a kitchen, a car (104). A third level (114) of this network consists of one or more powerful computer servers or mainframes (105). One can consider a more general (very large) network that would require several powerful servers for the third level.

For simplicity FIGS. 1 and 1A contain only one server in the third level 114 in the network that is located outside of a house. The wearable devices with embedded client computer systems can be wearable by one person. Almost every thing that is wearable by a person—a pen, wallet, key, notebook, camera, wrist watch, comb, pager, tape etc. can be equipped with an embedded chip and a communication port for receiving and transmitting radio and infra signal for short ranges.

Typically these embedded systems in wearable devices can have the following different functions:
a) fulfilling basic device functions (e.g. calculations in a pocket calculator, call processing's in a cellular phone);
b) user friendly control of basic devices functions (e.g. voice control); fulfilling of additional functions (e.g. Internet browsing in smart phones, a signaling system in a key);
c) (wireless) communication with other devices (in second and third network levels).

In FIG. 1 these embedded systems are moving together with a person 108 who wears them. A line 110 shows a path of a possible movement of the person 108 from the house to the car 106. Since these client embedded devices have a relatively little computer memory and processing power some computer tasks are executed by server computer systems that are located in the second network level 113. These server systems are drawn in FIG. 1 and 1A as shadow boxes 106 in an electrical piano 101, in a TV 102, in a refrigerator (103), in a car (104). The system 106 contains a package of databases and programs that are needed for executions of functions performed by client devices that are located on the person 108. Different functions that performed by various devices wearable by the same person are supported in parallel by a server if they are needed to be executed simultaneously.

For example, a person can write into a notepad and ask a wrist watch to display a time in London. Some tasks that are performed by different clients can be performed by the same program in the briefcase (for example, if a signal processing is executed in the briefcase, it can be performed for several clients that have mikes).

Client devices that are located on a person communicate via wireless channels with the nearest server that contains the briefcase. When a person moves far away from the server (e.g. 101) that contains the briefcase and is located near another server (e.g. 102 near a point 111 in the path 110) than the briefcase 106 from 101 is transported to 102 via wires (if 101 and 102 are connected) or via wireless channels. When the server can communicate with one or more of these clients, the client is said to be in communication proximity of the server.

Note that when the briefcase is transported from the server 101 to the server 102 the briefcase package in 101 is erased, in a preferred embodiment. When the person 108 moves outside the house to the car 104 the briefcase 106 is transported from the TV 106 to the server in the car (and the briefcase package in 102 can be erased when the briefcase 106 appears in 104). Another person 109 in the house is supported by a different briefcase 107 that is located in a refrigerator 107. This briefcase supports embedded systems in a user wrist watch (109a) and calculator (109b).

Typically briefcases 106 and 107 are different since they support different embedded devices for different persons (for example, wrist watches for these persons can contain different telephone databases that are displayed on wrist watches by user requests). A PC 115 in the house 100 may contain full briefcases for each person who leaves in the house. These briefcase packages are not erased when their content is copied to some server in the house.

This procedure of building a briefcase in some server is needed at the beginning. After a briefcase is built in some server where the user is located, it is transported with the user. PC briefcase are typically not erased, contrary to briefcases that are transported from a (second/next) server to another (second/next) server. When the user builds a briefcase package in some server (e.g. 101) from 115 it may download only packages that are needed for devices that are located on her/him. When the user finishes his/her journey, for example, goes to sleep, his/her virtual briefcase in the nearest server may be erased and only the briefcase in PC 115 remains (to be used next day).

The server 115 may be able to communicate with any server in the room 100 (e.g. with a refrigerator 103, TV 102 etc.), but not with a server in a car 104. At the beginning of a session (e.g. when a user awakes in morning and goes to a kitchen ) some server that is closest to the person (e.g. the refrigerator 103) would copy a briefcase (106) from 115A in 115. This briefcase then follows the user from a server to server.

The briefcases 107 and 106 may contain only packages to support devices that are on their users (three devices on the person 108 and two devices on the person 109). If the user (while staying at the house 100) gets an additional devices s/he should download an additional package for this device from 115. Servers in the second network level 113 communicate with embedded devices in the first network level that are located near them and with other neighbor servers in the network level two. These servers communicate between themselves (in short distance ranges) to transport virtual briefcases along user paths and with embedded devices (also located in short distance ranges) to support their functions. The task of the main server 105 in the third level 114 is different. The main server 105 can communicate directly with any server in the second level 113 or embedded devices in the third level 112, directly if the embedded devices/ clients are within communication range and in any case through the second level 113. The main server 105 is not restricted with short range distances and can help to transport briefcases to servers if transportation of briefcases between servers themselves was disrupted.

Disruption of briefcase transportation could occur when a person moves very fast. For example, in FIG. 1 the person 108 moves from the house to the car 104 (in the car 104 this person is denoted by a point 116). If the car leaves before the briefcase 106 is transported fully from the server 102 than a help from the main server 105 is needed to complete a building the virtual briefcase in the car server 104. There are several ways how the main server 105 can complete this briefcase building.
a) The main server 105 stores full briefcases of all users. In this case the main server 105 continues to build the briefcase 106 in 104 communicating with the server in 104 directly (via wireless channels) starting from packages that were already transported from the server 102 before interruption.
b) The main server does not store briefcase packages. In this case it communicates either with a server 102 or 115 where the original briefcase copy is stored. It reads packages that are stored in 102 or 105 and copies them to 104 (via 105). After finishing a building the briefcase in 104 the briefcase in 102 is erased (but not in 115 where it is stored permanently).

Another function of the main server 115 is to support embedded devices in the first network level directly if by some reason there is no a briefcase server near that could support these devices. This support can be done directly if the main server contain full briefcases (case a)) or via reading data in servers in the network level 2.

By reasons that were already explained in Summary above the communication between neighbor embedded devices in the first network level and briefcases in the second network level occurs much faster than the communication via the main server 105.

Figure 2:
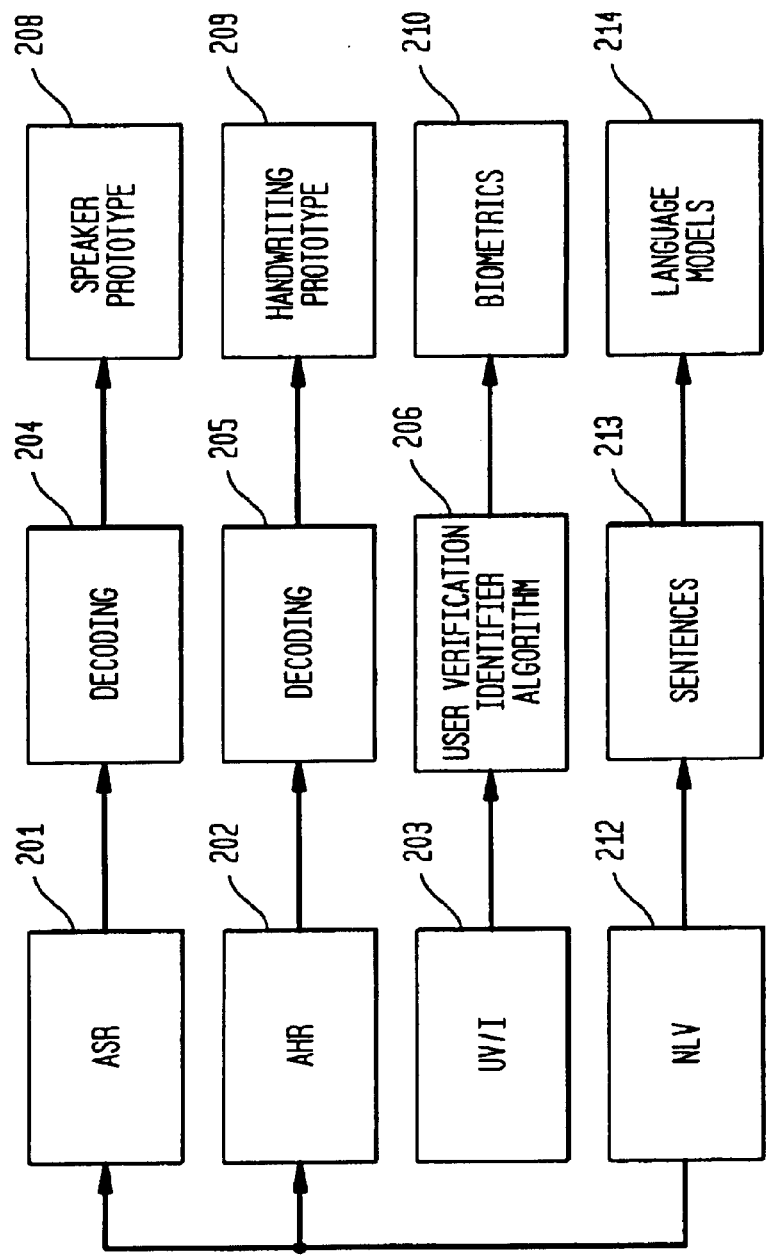
FIG. 2 is an example of a content of a briefcase.

With reference now to FIG. 2, there is illustrated a partial possible portion of a virtual briefcase. A briefcase contains programs and/or databases (or portions thereof) that allow the respective embedded devices to perform their function (s). These programs/databases might enable automatic speech recognition (ASR) tasks (201), automatic handwriting recognition tasks (AHR)(202), user verification/identification (UV/I) (203), and natural language understanding (NLU) (212). The briefcase contains programs and databases that are needed for implementation of these tasks. For example, the ASR server may contain decoding programs (204) and speaker prototypes (208) and AHR may contain decoding programs (205) and handwriting prototypes (209). A module 206 could contain user verification/identification algorithms that are based on biometrics 210. A module NLU 212 includes programs for recognition of semantics in decoded (via AHR or ASR) sentences 213 and language models (214). These tasks are well known but the distribution of them between the client and computer and the movement of the programs/databases in the briefcases between computers to follow a moving client is new.

Figure 3:
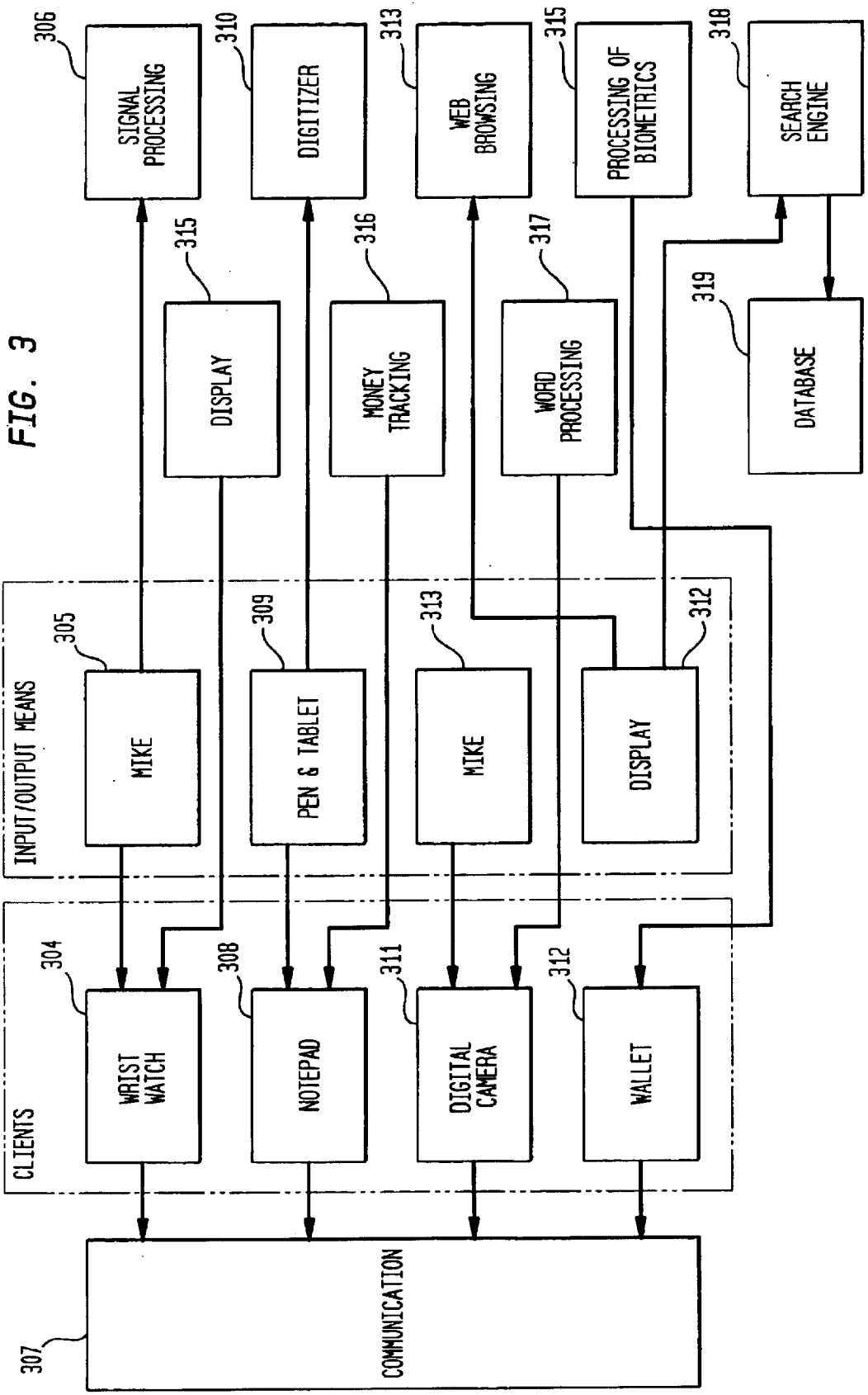
FIG. 3 is an example of functions of embedded clients.

With reference now to FIG. 3, there is illustrated possible functions of embedded clients. Examples of clients in this figure are a wrist watch (304), a digital notepad (308), a digital camera (311), a digital wallet (312). Typically clients contain input/output means (e.g. a mike (305, 313) a digital pen/tablet (309, 313), display (312)). Typical programs that support client actions are signal processing (306) (signal processing can be performed in real time by embedded devices and efficiently compresses speech which can be faster transmitted to servers for father processing), digitizing (of pen input) (310), web browsing (313), processing of biometrics for user verification/identification (314), money tracking/organizing packages (316), a word processing program (317), a search engine (318), a database used by the application (319) (e.g. by a search engine 318). Another important function of a client server is supporting interchanging data between clients and servers via communication channels (307).

Figure 4A:
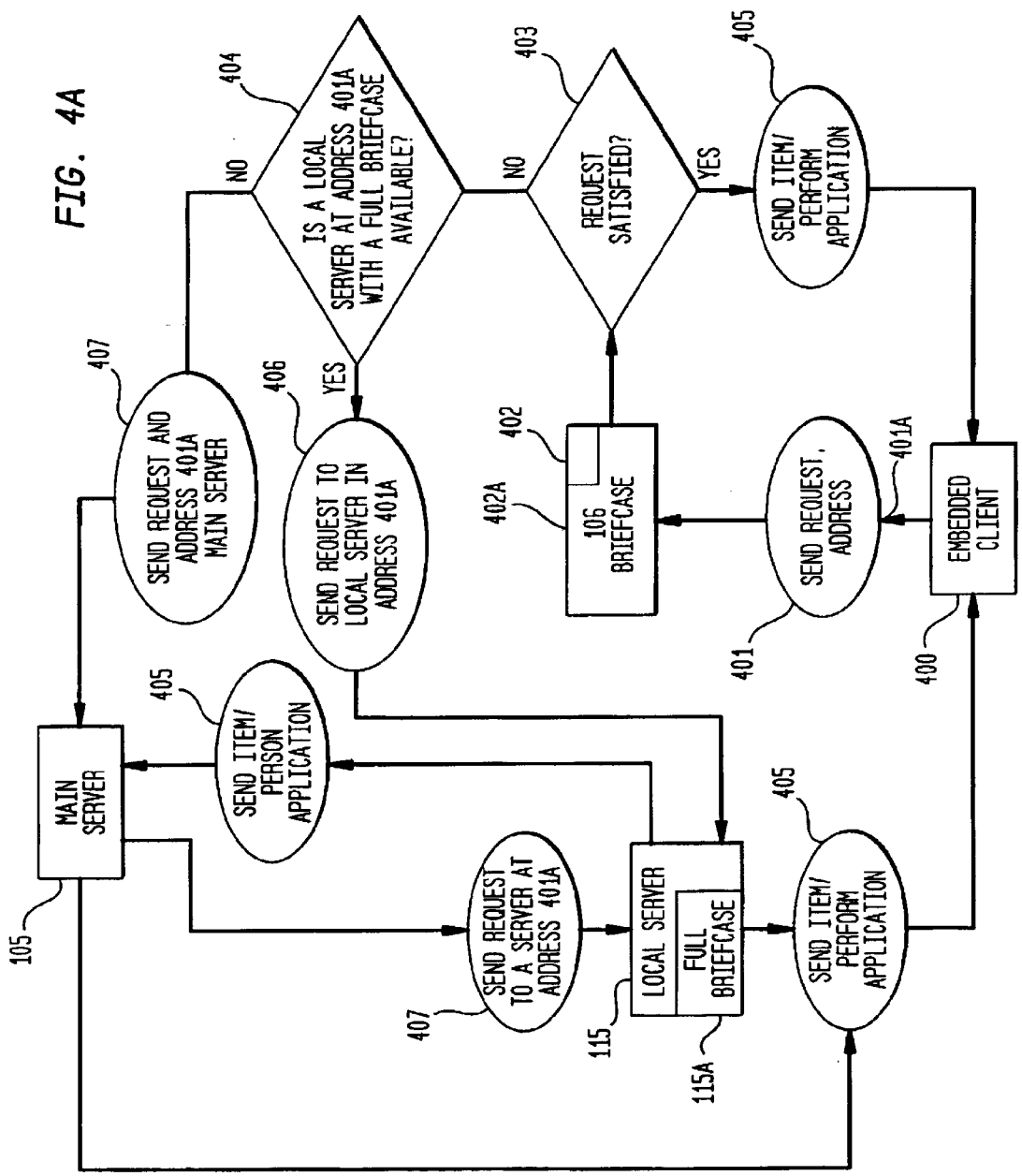
FIG. 4A is a second example of client-briefcase-server data interchange.

With reference now to FIG. 4 and FIG. 4A, there is illustrated an example of interface between a client embedded device 400, a briefcase in a server 106, a full briefcase 115A in a server 115 and a main server 105. FIG. 4 illustrates the case a) when the main server 105 stores all full briefcases of all users. In this case a) the client 400 sends a request 401 for some data item or application to the briefcase 106. There it is checked (via 403) whether this item or application is contained in the briefcase memory (cache 402). If YES than the item/application is sent to the client 400 via (405). Otherwise this requests is sent (404) to the local server 115 that contains a full briefcase 115A. There is checked (via 403) whether the request can be satisfied. If YES then the item/application is sent (via 405) to the client (400). There can be situations when the local service with a full briefcase does not contain a requested item. This can happen if a person moved from a zone of one local server with a full briefcase to another zone that is supported with a full briefcase with different functions. For example a person moved from a home (that supported by a server 115) to an office that is supported by different full briefcase. Since in the office only clients that are typically stored in the office are supported, the office briefcase may not support a client that was brought from home. In this case, the request is sent to the main server 105. The main server then sends the item/application 405 to the client 400. The main server also can send this item/application (406) to the briefcase 106 in order that this item/application where available if they are requested by some clients again.

FIG. 4A illustrates the case b) when the main server does not store briefcase packages The case b) coincides in many steps with the case a). The client 400 sends a request 401 for some data item/application to the briefcase 106 that is located in the server 402A. The client also sends an address of 401A of a server 115 where a full briefcase 115A is contained. The server 106 checks (via 403) whether this item/application is contained in the briefcase memory (cache 402). If YES than the item/application (405) is sent to the client (400). Otherwise, it is checked whether the server 115 (at the address 401A) is in a range of the server 402A. If YES then the request is sent (via 406) to the local server 115. This server sends the item 405 from the full briefcase 115A to the client (400). Otherwise, the communication with the server 115 is proceeded through the main server 105. Namely, the request and the address 401A are sent (via 407) to a main server 105. The main server 105 sends the request to the server 115 at the address 401A. The local server 115 sends the item/application (405) to the main server 105 and the main server sends (405) to the client (400).

Figure 5:
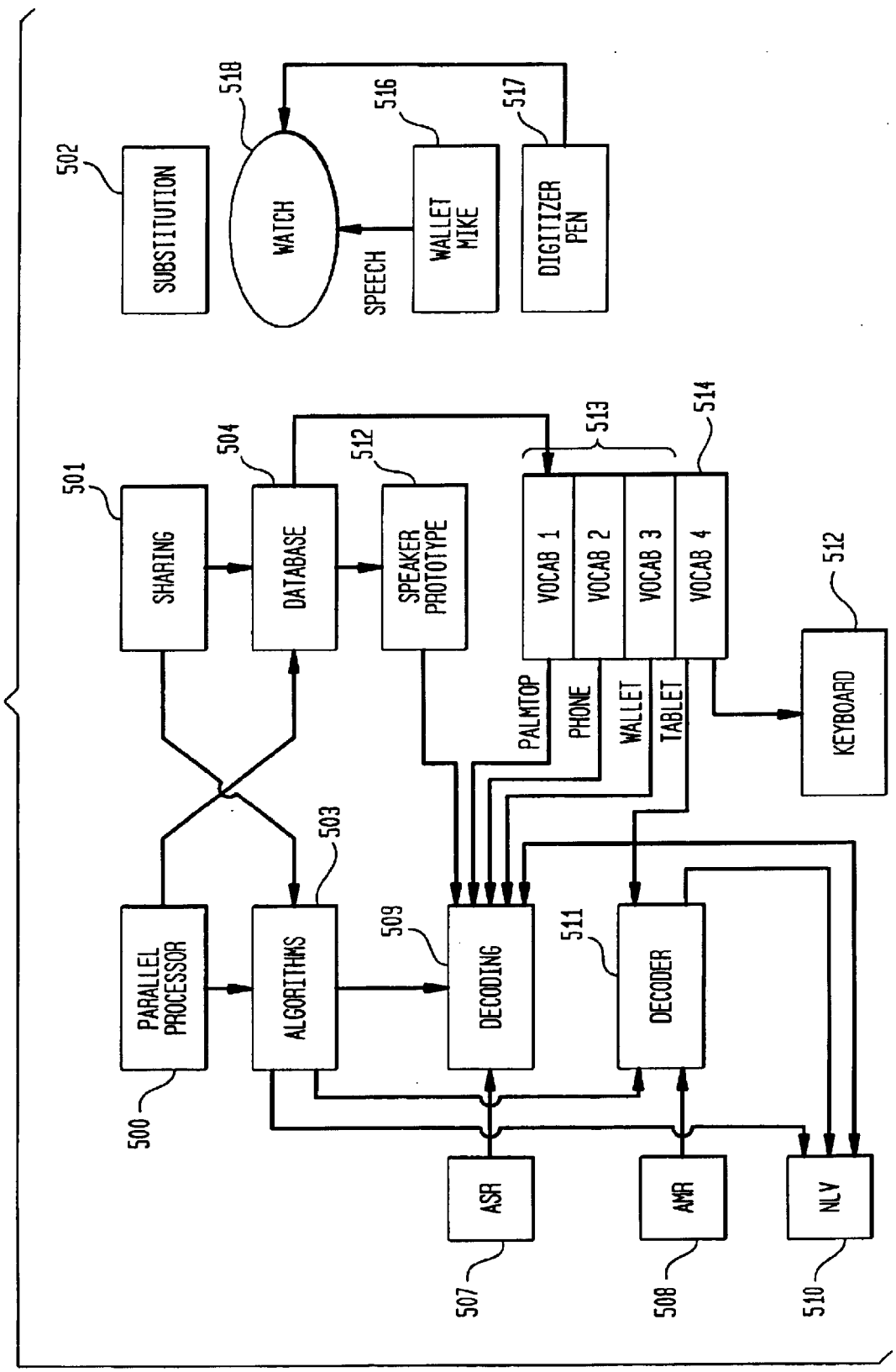
FIG. 5 is a block diagram of a briefcase-clients interface.
Figure 5A:
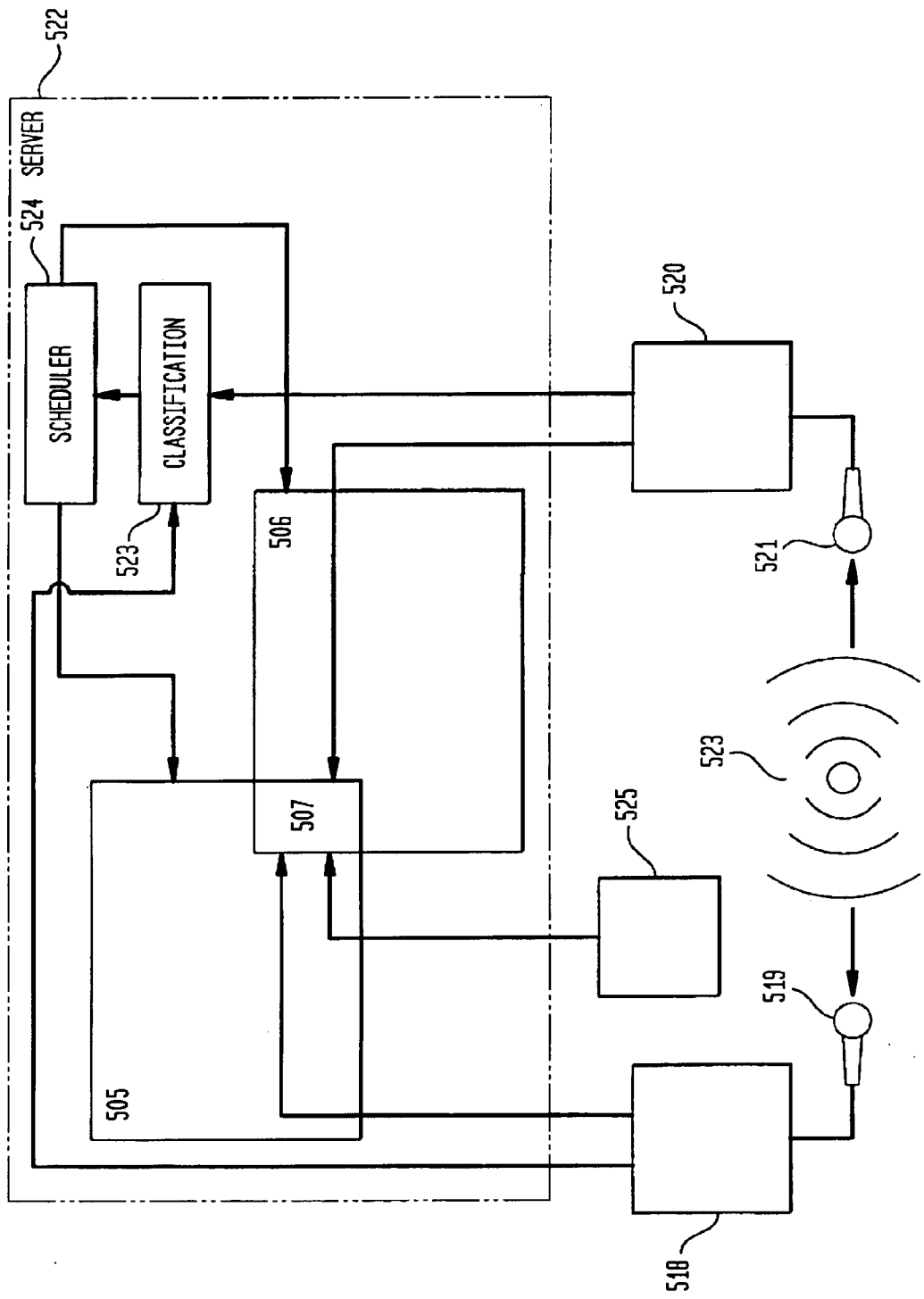
FIG. 5A is an example of a briefcase-clients interface.

Refer to FIG. 5 and 5A.

There can be delays and interruptions in a virtual briefcase work if several clients submitted jobs to a briefcase server at the same time and a server has insufficient CPU to process requests from several clients simultaneously or if some of clients submitted computationally expensive jobs. Similar problems occur if there are several briefcase on the same server that are processing jobs from their clients at the same time. The overload of CPU in the server can be eased if there is an efficient organization of processes that are performed in the server for different briefcases and clients.

In order to process jobs from clients on servers more efficiently process should be characterized how they can be scheduled (block 524 in a server 522 in FIG. 5A). For this the following classification (block 523 in FIG. 5A) of processes can be useful that is done in a server (522 in FIG. 5A).

Processes in a briefcase server 106 can be classified as parallel processing (500), sharing (501) or substitution (502). Parallel processing is performed for different programs or for transferring different data items that are needed by different client devices at the same time. For example, a person may spoke to one device and wrote data in another device. This may require work of ASR and AHR modules at the same time. Many servers allow jobs to be run in parallel. Sharing processing is performed when the same programs or transferring data can be performed for different devices. For example, signal processing can be performed for mikes that are stored in different clients (e.g. a wallet and a palmtop). Sharing can be done for the same process in different briefcases (505 and 507 in FIG. 5A) on the same server (522 in Figure A)). This can happen if two persons with their clients (e.g. palmtops 518 and 520 in FIG. 5A) are located near the same server (522 in FIG. 5A) that contains briefcases (505 and 506 in FIG. 5A) of these persons. If their clients needed to process the same input (e.g. voice 523 in FIG. 5A from some speaker) via mikes (519 and 521 in FIG. 5A) on these clients, then the server (522 in FIG. 5A) can perform an ASR decoding (507) simultaneously for different clients despite the fact that they report to different briefcases. Substitution process occurs when facilities of one device are used for another device. For example, one client has a mike 516 (e.g. a wallet) or digitizer 517 (e.g. a digital pen), and another has no mike or digitizer (e.g. a watch). In this case a mike in a wallet can be used to process speech commands for the watch, and similarly a digital pen with a tablet can be used to process handwritten commands for other devices. Examples of algorithms (503) that can be processed in parallel are decoding (509) for ASR (507), decoding (511) for AHR (508), NLU (510).

In FIG. 5 arrows are directed from decoding to NLU since NLU is usually done on texts that were decoded by ASR or AHR. Algorithms also can be shared if they are used for different clients (for example, if both clients need to process voice commands through ASR 507 in a server).

The following database items 504 can be either used in parallel or by the sharing module: speaker prototypes (512), vocabularies 1,2,3, 4. For example, a decoder 509 can use different vocabularies vocab 1, vocab 2 and vocab 3 (513) for different devices—parallel processing—(e.g. a palmtop, smart phone and wallet), and the same vocabulary vocab 4 (514) for two different ways to provide input—sharing process—(e.g. via handwriting on a tablet or a keyboard in a palmtop).

When a scheduler module 524 in FIG. 5A gets a request to process a job it receives from the classification module 523 in FIG. 5A a description of a class of a processor and data (parallel, sharing or substitution). In accordance with this class the scheduler 524 organizes how jobs are run in the server 522. For example, if the classifier 523 finds that two submitted jobs can be processed at the same time and that they do not have common components it classifies these jobs as parallel (i.e. they should be run in parallel). In this case the scheduler 524 allocates CPU resources in 522 in such a way that these jobs were run simultaneously using different RAM parts.

If the classifier 523 finds that two different jobs (submitted by clients that belong to the same or different briefcases) have common components (for example, uses the same voice input from different mikes and needed to perform the same decoding task) then these processes are characterizes as shared and the scheduler allocates the same memory resources to process two job requests.

If the classifier finds that some job requires data that is not provided by a first client 505 that submitted this job it checks whether this data is provided by other clients that is related to the same briefcase (e.g. 505) to which the first client belongs. If it finds that the data to process the job request is provided by a second client related to this briefcase (505) it put this job in a substitution class and the scheduler 524 connect resources that were allocated for the second client with resources that were allocated for the first client in order that the data from the second client could be used by the first client. If it does not find such a client in the briefcase 505 it can check whether other briefcases (e.g. 506) that are located on this server (522) have clients that are processing data that is needed for the first client. For example, the first client 525 may needs voice data that is provided by a mike. In this case the needed data is obtained either from the client 518 that has a mike 519 and that is connected to the same briefcase 505 as the client 525. If there would be no a client 518 with a mike 519 a help could be get from a client 520 that has a mike 521.

Refer to FIG. 6.

Clients connected with servers via communication interface means. Communication interface means that are located on a server and client devices allows interchange of signals (usually wireless) between clients and servers, transferring data etc. Communication interface includes regular exchange of signals between a server and a client in order that they could verify that they are located in a communication range. These signals can be sent by special signal generators that are located on servers and clients. In the case that a server and a client are performing some interactions (interchanging some data or information) signals that carry this data can be used to check whether a server and clients are located in a communication range. In FIG. 6 the example is given in which clients 609, 610, 611 are connected to a server 600 via communication interface 607 and clients 612, 613, 611 are connected to a server 601 via communication interface means 608. The client 611 is in overlapping communication ranges of both servers 600 and 601, i.e. the client 611 can communicate directly with each of these servers. This can happen when a user with the client 611 is moving from the communication range of the server 600 to the communication range of the server 601. Some briefcase packages with highest priorities (see description below) can started to be copied from the server 600 to the server 601 while the client 611 is located in the overlapping communication ranges of both servers 600 and 601.

In order to transfer a briefcase from one server 600 to another server 601 the briefcase content (in a stack 614) is prioritized via 606. First briefcase packages that are transferred are those that are being used by client devices on a user at the moment that the transferring occurs (606a). For example, if at the given moment the user gives voice commands to his/her watches all packages related to ASR and the watch are transferred first. This is done in order that this service was not interrupted when the user will be located near the server 601 far away from the server 600. The next priority is going to packages in the virtual briefcase that are shared by many clients (606b). If the package is shared by several clients it is more likely to be used than the package that is shared by only one client. A next priority items are formed from a past history of bow frequently packages were used (606c). This history data (606c) is also used to remove some applications without copying it to the other service if these applications where never requested by clients during some long period (e.g. one or several years).

Another criteria that is used when to decide what briefcase package should be transferred first is whether a client device that is supported by this package is located on the user (606d). Only devices that are actually wearable by the user at a moment of transferring the briefcase in 600 may call for packages in 600. Therefore the packages related to these devices are transferred earlier than packages for devices that are not on the user. After that remaining packages (606e) are transferred.

Before the content of the briefcase in 600 is transferred one verifies (602) whether the server 601 is closer to the user than 600. This can be measured by using strength of signals that are receiving from clients. Another way to measure closeness of users to servers is to use sensors that detect users (like sensors that turn on lamps when persons are near those lamps that are described in U.S. Pat. No. 5,745,035, Motion Detection System which is herein incorporated by reference in its entirety). Methods for sending signals and for detecting whether some clients are in the range of communication can be similar to those that are described in ("NON INTRUSIVE AUTOMATIC REMOTE SUPPORT FOR FREEING OVERLOADED STORAGE IN PORTABLE DEVICES", Ser. No. 09/225,000, filed on Jan. 5, 1999 to Kanevsky and Zadrozny, which is herein incorporated by reference in its entirety).

In one variant in FIG. 6 a client 611 is located in a communication range of both servers 600 and 601. Such situations are typical when a client moves from a communication zone of one server to a communication zone of a second server. There can be cases when there are no overlapping zones between different servers or that a user is moving very fast and therefore can be moved to the zone of the second server (601) before the briefcase is transferred (from 600 to 601). If it was detected that the user moved closer to the server 601 the module 602 sends a signal to the server 600 and transportation 603 begins. The transportation of briefcases also can be started if the communication between the server 600 and a client is lost and the communication between the client and the server 601 is established. First a part of a briefcase with the highest priority is copied (some packages that are responsible for some client actions) (604). After verification that a package from the briefcase in 600 is copied (605) it is removed (606) from the server 600.

Then this procedure is repeated for the packages with lower priorities. Packages that are sent from the server 600 to the server 601 are stored in a stack 615 in this server 601. This stack is prioritized via prioritized module 616.

We claim:

1. A computer system comprising:
    one or more memories and one or more central processing units (CPUs);
    one or more communication interfaces, each of the communication interfaces capable of receiving a client signal from one or more clients indicating that a client is within a range of communication of the computer;
    one or more computer interfaces capable of communicating with one or more second computers, the second computers each having a computer location and one of more application programs;
    an application process that determines from one or more client signals that one or more clients are within the range of communication and that requests and receives one or more of the application programs through the computer interface from one or more of the second computers so that one or more clients can cause one or more of the CPUs to execute one or more of the application programs, the one or more CPUs executing the one or more application programs when the one or more clients request the one or more application programs.

2. A computer system, as in claim 1, where one or more of the second computers is a local computer that has copies of all applications for all clients that are in a communication range of another second computer that is in a communication range with the local computer.

3. A computer system, as in claim 2, where one or more clients send a request for some item/application in a package and an address of the local computer to one or more second computers.

4. A computer system, as in claim 3, where the item/application is sent to the client if it is found on one or more second computers.

5. A computer system, as in claim 4, where one or more second computers check whether they are in a communication range from the local computer at the address that was sent by the client.

6. A computer system, as in claim 5, where the local computer checks whether it has the requested item/application if it is in the range of communication from one or more second computers and where the local computer sends the requested item/application if the local computer found the item/application.

7. A computer system, as in claim 5, where the request/application and the address of the local computer is sent to a main server if it was found that the local server is not in the communication range of one or more second computers.

8. A computer system, as in claim 7, where the item/application from the main server is sent to the client that requested this item/application if this item/application was found.

9. A computer system, as in claim 7, where the request for the item/application was sent to the local server at the address that was received by the main server if this item/application was not found in the main server.

10. A computer system, as in claim 9, where the local server sends the item/application to the main server and the main server sends this item/application to the client.

11. A computer system, as in claim 1, where one or more of the applications is an application portion.

12. A computer system, as in claim 11, where the application portions are classified in accordance with how processes that are needed to run these applications can be handled.

13. A computer system, as in claim 12, where processes can be handled to be run in parallel, can be shared by different applications or can be substituted.

14. A computer system, as in claim 13, where application portions are classified as parallel, shared or substituted.

15. A computer system, as in claim 14, where the application portions are scheduled to be run in CPUs and memories in accordance with their classification.

16. A computer system, as in claim 11, where the application portion is a front end of a speech recognition system.

17. A computer system, as in claim 16, where the front end of the speech recognition system includes a microphone and signal processor.

18. A computer system as in claim 11, where the application portion is a front end of a word processing system.

19. A computer system, as in claim 18, where the front end of the word processing system includes a keyboard.

20. A computer system, as in claim 11, where the application portion includes any one or more of the following: an automatic speech recognition front end, an automatic handwriting recognition system front end, a user verification system front end, a user identification system front end, a natural language understanding system front end.

21. A computer system, as in claim 1, where the computer determines that one or more clients pass outside of the range of communication.

22. A computer system, as in claim 21, where the computer discards one or more of the applications after one or more clients pass outside of the range and after the discarded applications have been sent to one or more of the second computers.

23. A computer system, as in claim 22, where applications that are discarded belong to one package.

24. A computer system, as in claim 23, where all clients that are linked to the package pass outside of the range.

25. A computer system, as in claim 21, where one or more clients that pass outside of the range of communication are linked to the same package.

26. A computer system, as in claim 21, where the computer discards one or more of the applications after one or more client pass outside of the range.

27. A computer system, as in claim 26, where all applications in one package are discarded after all clients that are linked to this package pass outside of the range.

28. A computer system, as in claim 21, where the computer determines whether one or more clients are outside of range by measuring distance from this computer to these clients.

29. A computer system, as in claim 1, where the communication interface receives a second client signal when one or more clients pass outside of the range of communication.

30. A computer system, as in claim 29, where the communication interface receives a second client signal when one or more clients that are linked to a package of programs pass outside of the range of the communication.

31. A computer system, as in claim 30, where all clients linked to one package of programs are wearable by one person.

32. A computer system, as in claim 1, where application programs are grouped into packages and one or more clients are linked to packages in such a way that application programs in each package support only clients that are linked to this package.

33. A computer system, as in claim 32, where all clients that are wearable by one person are linked to one package of application programs.

34. A computer system, as in claim 1, where the computer discards one or more of the applications after the discarded applications have been sent to one or more of the second computers.

35. A computer system, as in claim 34, where all discarded applications belong to the same package.

36. A computer system, as in claim 34, where the second computer is less busy than the computer.

37. A computer system, as in claim 1, where part of the application remains as a second portion on one or more of the second computers.

38. A computer system, as in claim 37, where the second portion includes any one or more of the following: an automatic speech recognition back end, an automatic handwriting recognition system back end, a user verification system back end, a user identification system back end, a natural language understanding system back end, a word processing system back end, and a database.

39. A computer system, as in claim 37, where one or more of the second portions run in parallel with one or more of another second portions.

40. A computer system, as in claim 37, where one or more of the second portions is shared by different clients.

41. A computer, as in claim 37, where one or more of the second portions belong to the same package.

42. A computer, as in claim 37, where one or more of the second portions belong to different packages.

43. A computer system, as in claim 37, where one or more of the second portions shares the same data stored by one or more of another second portions.

44. A computer system, as in claim 43, where one or more of the second portions are signal processing that perform on inputs from different mikes located on different clients.

45. A computer system, as in claim 37, where one or more of the second portions are the following: Automatic Speech Recognition (ASR) and Automatic Handwriting Recognition (AHR).

46. A computer system, as in claim 1, where the applications are received in a priority order.

47. A computer system, as in claim 46, where priority order includes the following: applications that are currently used by a user, applications that are shared by many users, applications that shared by small number of users, applications that involve clients that are wearable by a user.

48. A computer system, as in claim 46, where priority order is defined by history data on how often some applications were used.

49. A computer system, as in claim 1, where one of the computer interfaces receives a second client signal when one or more clients pass outside of the range of communication.

50. A computer system, as in claim 1, where the communication interface includes any one or more of the following: a radio link, an infrared link.

51. A computer system, as in claim 1, where the computer interface includes any one or more of the following: a network, a wide area network, a local area network, an internet, an intranet, a telephone network, a radio frequency network.

52. A computer system, as in claim 1, where the client includes any one or more of the following: a moving computer, a pen input device, a personal data assistant, a watch, a palm top, a telephone, a key, a speech recognition system.

53. A computer system, as in claim 1, that is incorporated in any one or more of the following: a printer, a television, a microwave, a refrigerator, a car, a public structure, a lamppost, a mail box.

54. A computer system, as in claim 1, where one or more of the second computers is a main computer that has copies of all of the applications as backup.

55. A computer system, as in claim 1, where one or more clients send a request for some item or application in a package to one or more second computers and if such application or an item is not available one or more second computers send a request for this application or item to a main computer and the main computer performs the requested application for these one or more clients or sends the requested item to the one or more clients.

56. A computer system, as in claim 55, where the requested item and application are sent to packages in one or more second computers that are linked to one or more clients that requested this item or application.

57. A computer system as in claim 1, where the applications are received from a backup computer if communication with second computer fails.

58. A computer system, as in claim 1, where the client signal is received from one or more of the following location devices: a pressure sensor, an ultrasonic detector, a radio frequency tag, a motion detector.

59. A computer system, as in claim 1, where the applications include any one or more of the following: a web browser, a financial program, a word processing program, a search engine, a database used by the application, a general database.

60. A computer system, as in claim 1, where selected one or more of the applications are discarded if the selected one or more applications are not executed by one or more of the CPUs within a time period.

* * * * *

UNITED STATES PATENT AND TRADEMARK OFFICE
CERTIFICATE OF CORRECTION

PATENT NO. : 6,912,580 B1  
DATED : June 28, 2005  
INVENTOR(S) : Kanevsky et al.

It is certified that error appears in the above-identified patent and that said Letters Patent is hereby corrected as shown below:

Column 4,  
Line 4, before "Speech" and after "Automatic" delete "[speech]".  
Line 14, before ".com" and after "www." replace "lbs" with -- lhs --.  
Line 20, before "example" and after "processing," replace "For" with -- for --.

Column 5,  
Line 9, before "in" and after "call" replace "processing's" with -- processings --.

Column 8,  
Line 6, before "The" and after "packages" add -- . --.

Column 13,  
Line 30, before "system" and after "recognition" add -- user verification --.  
Lines 30-31, after "end," delete "a user verification system back end,".

Column 14,  
Line 1, before "shared" and after "that" insert -- are --.

Signed and Sealed this

Twenty-second Day of November, 2005

JON W. DUDAS  
*Director of the United States Patent and Trademark Office*